July 5, 1966  E. C. BAROCELA  3,259,449
APPARATUS FOR CONTINUOUS FEED OF MOTION PICTURE FILM
Filed June 26, 1964
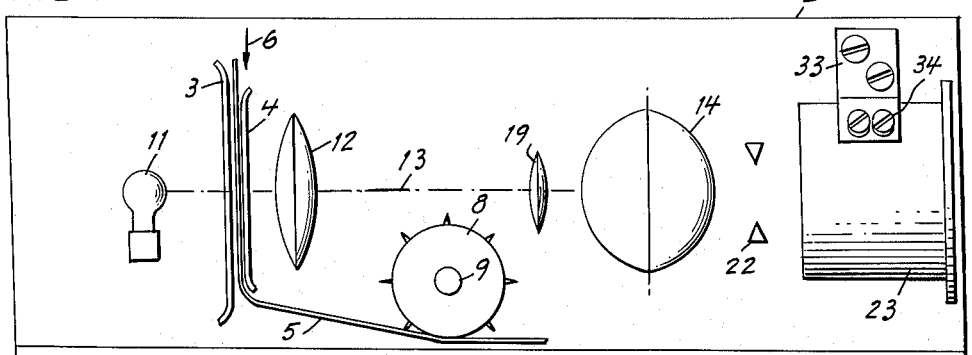
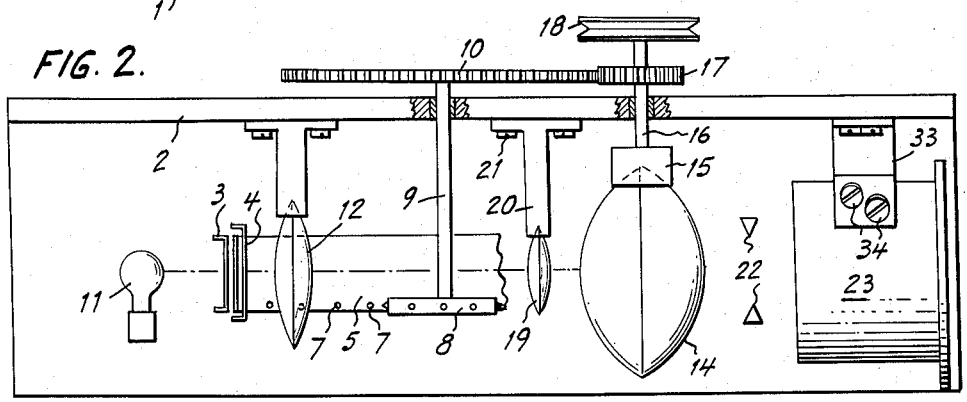
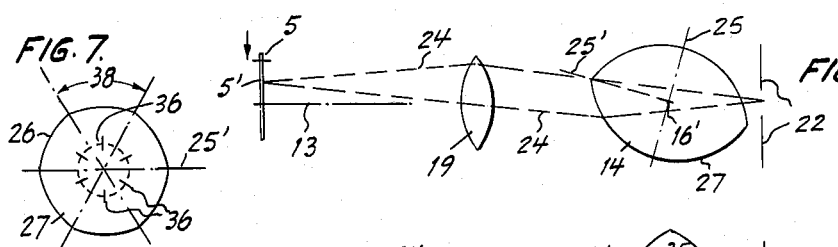
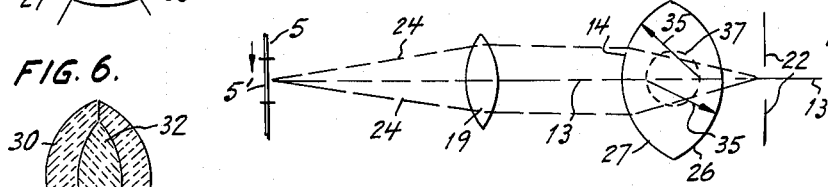
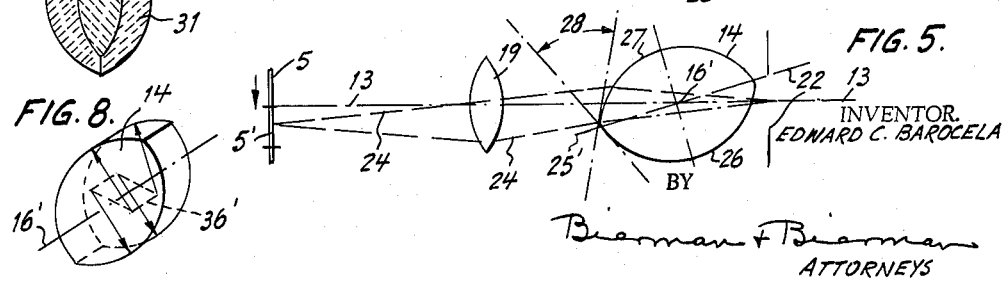
INVENTOR.
EDWARD C. BAROCELA
BY
Bierman & Bierman
ATTORNEYS

United States Patent Office 3,259,449
Patented July 5, 1966

3,259,449
APPARATUS FOR CONTINUOUS FEED OF MOTION PICTURE FILM
Edward C. Barocela, Levittown, N.Y., assignor to Instruments Corporation of America, a corporation of New York
Filed June 26, 1964, Ser. No. 378,288
8 Claims. (Cl. 352—119)

The present invention is directed to the taking or displaying of moving picture film and more particularly to an apparatus for so doing which will give improved results. This application is a continuation-in-part of copending application Ser. No. 136,246, filed Sept. 6, 1961, now abandoned.

There is now generally in use apparatus for projecting motion picture film in which the film is passed intermittently through a projector and each frame is stationary as it is projected onto a screen. This has a serious disadvantage in that vibration is set up in the operation, the film is unduly stressed, and the mechanism is subject to deterioration. To overcome this, it has been proposed to move a film continuously through a projector and, to compensate for the movement, to provide a prism having, say, four or more faces which refract the image and follow the motion of the film to project what appears to be a series of still pictures. However, these devices have not come on the market for a number of reasons. The refracting faces deformed the image due to the variations in the rate of displacement of the image. Also, with prisms of relatively small number of faces, deformation would take place. If a large number of faces were provided, the prism would become quite difficult to manufacture. Also compensating lenses or other optical elements were necessary in such structures to correct unwanted aberrations.

The present invention is intended and adapted to overcome the disadvantages inherent in prior devices of the type described, it being among the objects thereof to provide a relatively simple construction which has relatively few moving parts, is reliable in operation, and inexpensive to manufacture.

It is among the objects of the invention also to provide such a device which practically eliminates the distortion of the image and gives a clear, true projection through the entire area of the frames.

It is further among the objects of the present invention to provide a system of the type described which is applicable not only to the projecting of moving picture film but also to the taking of moving pictures.

In practicing the present invention, there is provided a projector or a camera having the usual operating parts. However, in place of the prism previously proposed but not actually in commercial operation, Applicant provides a lens of special construction which may be termed a refractor. In the simplest embodiment, the refractor is a symmetrical double convex lens which is quite thick relative to its diameter. In other embodiments it can have more than two convex surfaces subtending equal angles and having the same radius of curvature. In each case the centers of curvature are symmetrically located around the axis of rotation. As is well known, in a double convex lens the optical axis corresponding to each surface, which contains the center of curvature and the vertex of that surface, coincides with the optical axis of the lens which passes through the optical center of the lens.

In the particular case of a symmetrical double convex lens, where both surfaces have equal radii of curvature, the optical center of the lens coincides with its geometrical center, therefore both centers of curvature are located at equal distances from the center of the lens, on its optical axis.

This is the case of the refractor used in this embodiment, where the two optical axes corresponding to both refracting surfaces intersect at the center of the lens at an angle of 180°.

Since the centers of curvature are equidistant from the center of the refractor, a circle can be drawn that contains the centers of curvature of the surfaces. The refractor has at least two convex faces, each of which is less than a hemisphere, the adjacent faces forming a thin edge at the meeting line. This means that the center of curvature of each face lies on the opposite side of the center of the refractor. Obviously, if the centers of curvature coincided with the center of the refractor, this would become a sphere. Also, if the center of curvature of each surface were located between the vertex of that surface and the center of the refractor, no edge would be formed between the surfaces. When two faces meet to form this edge, the tangents to the surfaces at the meeting line thereof are at an angle to each other of about 5° to 30°. This angle is determined by the distance between the center of the refractor and the centers of curvature of the convex faces. If this distance is very small, the shape of the refractor will approximate that of a sphere, and the tangents to two adjacent surfaces, drawn at the meeting edge, will be almost coincident, the angle between them approaching zero degrees.

On the other hand, if said distance is very large, the radius of curvature of the surfaces will also be large. That is to say that the convexity of the surfaces will be very slight, approaching a plane surface, and the shape of the refractor will approximate that of a plane parallel plate in the case of a two-surfaced refractor, or a polygonal prism in the case of a multi-surfaced one.

If the refractor is made with more than two surfaces, the optical axis of these surfaces will intersect at angles other than 180°. Since the refractor has to be symmetrical, those axes have to intersect at the center of the refractor, forming equal angles.

That is to say that in a refractor having three surfaces, for instance, the optical axis of the surfaces will intersect at angles of 120°; in a four-surfaced refractor, at angles of 90°, and so on. In general, the angle subtended by the optical axes of two adjacent faces is equal to 360°/N, where N is the number of faces in the refractor. Obviously, this angle will be equal to the angle subtended by each surface, from edge to edge. It will also be equal to the angle subtended by the centers of curvature of two adjacent surfaces on said circumference.

The axis of symmetry of the refractor, which is also its axis of rotation, passes through the center of the circumference normal to its plane. This plane obviously contains the optical axis of all surfaces, and it is made to coincide during rotation of the refractor with the plane that contains the optical axis of the system and is parallel to the direction of travel of the film.

The invention is more fully described in connection with the accompanying drawing constituting a part hereof in which like reference characters indicate like parts, and in which—

FIG. 1 is a somewhat diagrammatic front elevational view of a projector made in accordance with the present invention;

FIG. 2 is a top plan view of the projector shown in FIG. 1;

FIGS. 3, 4 and 5 are diagrams showing the manner in which the light is refracted through the lens, illustrating the results obtained by the present invention;

FIG. 6 is a transverse cross-sectional view through a modified form of refractor;

FIG. 7 is a cross-sectional view of another form of refractor having six surfaces; and FIG. 8 is a cross-sectional view of still another refractor having cylindrical surfaces.

The base 1 of the projector has an upstanding panel 2 which carries guides 3 and 4, between which film 5 moves in the direction of arrow 6. The film has openings 7 which mesh with teeth on sprocket 8, mounted on shaft 9 and rotated through gear 10. A source of light 11 sends rays through the projector.

Usually there is provided a compensating lens 12 to compensate for the slight distortion due to the flatness of the film as the light passes through the same but such a lens is not essential. Light passes from source 11 through the film and lens 12, as shown at 13, and then through an optical rectifier, namely, refractor 14. This is held in a base 15 having a shaft 16 carrying pinion 17, meshing with gear 10. A pulley 18 on shaft 16 or other means are provided for imparting the necessary rotation to the moving elements.

The refractor rotates about an axis passing through its center perpendicular to the plane that contains the optical axes of all surfaces.

Preferably there is placed a lens 19 adjacent to refractor 14 and between it and lens 12. Lens 19 is held in bracket 20 attached to panel 2 at 21. Usually there is provided a window 22 through which the light passes on its way through projecting lens 23, which is mounted on bracket 33 attached to panel 2. Window 22 masks any unwanted areas around the frame.

In FIG. 6, there is illustrated a modified form of refractor consisting of a pair of convexoconcave lenses 30 and 31 having a double convex lens 32 therein forming an achromatic refractor, thus providing for compensation for color aberrations of the refractor. Lens 32 is made of a material having a refractive index different from that of lenses 30 and 31.

In FIG. 7 there is shown a refractor having six faces, each subtending an arc 38 of 60°. Each arc has its center 36, on circumference 37, at a point bisecting angle 38 but on the opposite side of the geometric center of the refractor.

In FIG. 3 there is shown a frame 5' in position so that it is projected as shown by lines 24, the light being refracted through refractor 14 and then passing through window 22. As it continues its movement, as shown in FIGS. 4 and 5, the frame is projected along line 24 and its movement is followed by the rotating refractor 14, so that at the plane of window 22, perpendicular to the optical axis 13, a stationary image of the moving frame is formed by the combined action of lens 19 and the entrance surface of the refractor. The exit surface being so close to the image plane, has practically no effect on the image formation.

As can be seen from these figures, the motion of a film frame past the optical axis of the system is accompanied by the rotation of the refractor so that one of its surfaces follows the displacement of the frame. For each frame, the refractor rotates a fraction of a revolution equal to the reciprocal of the number of surfaces in the refractor.

The plane of window 22 can be made tangent to the circle described by the edges of the refractor during rotation, window 22 being so close to the refractor that it barely clears those edges. In this manner, the exit surface of the refractor will be practically coincident with the image plane and will therefore act only as a field lens, having little or no effect on the focusing of the image or the compensation of its motion. These functions are performed by the entrance surface of the refractor.

When the image plane is tangent to the refractor the entrance surface is the only active surface and it is perfectly possible to employ a refractor having an odd number of faces.

Three surfaces, for instance, can be used because the active surface, in this case the entrance surface, does not require the cooperating action of an opposite face in order to produce the optical motion compensation, as is the case in other rotating optical compensators used in the prior art.

The terms "entrance surface" and "exit surface" as used in this description, are referred to the optical system of a projector, since obviously in a camera they would have to be reversed. There is substantially no distortion of the projected image, which is stationary on the screen.

In its simplest form the refractor has two faces and a transverse axis as shown at 25' and a longitudinal axis 25, the length of axis 25 being somewhat less than that of axis 25'. Each of the faces 26 and 27 are spherical but less than a hemisphere. Refractor 14 may have cylindrical surfaces, in which case the axis 36' (see FIG. 8) of each cylindrical surface is parallel to the axis of rotation 16'. If cylindrical surfaces are used, auxiliary lenses 12 and 19 may be cylindrical to compensate for the anamorphic effect.

The refractor 14 has at least two convex surfaces, which may be either spherical or cylindrical. All surfaces have equal radii 35 and subtend equal angles, thereby making a symmetrical optical component. The dimensions of the refractor obviously depend upon the number of surfaces and the frame dimensions.

The dimensions of refractor 14 and the index of refraction of its material are computed so as to obtain a linear displacement of the image and a constant magnification. Auxiliary lenses 12 and 19 are computed so that, together with refractor 14, they form a well-corrected image, according to good optical design practices.

It has been found that Crown glass having a high index of refraction aids in the design of a refractor of practical dimensions. These dimensions obviously depend upon the size of film being used and the number of surfaces of the refractor, but the proportions can always be measured in terms of the angle 28 formed by the tangents to two adjacent surfaces at their meeting line, as shown in FIG. 5.

For proper operation of the optical compensator, this angle should be within the limits stated above, which correspond to a refractor having rather deeply curved surfaces. This is necessary in order to avoid distortion of the stationary image and to assure proper image motion compensation, avoiding what is known as "tracking error." These proportions of the refractor will also minimize the defocusing effect that results from the varying thickness of the refractor, along the optical axis of the system, as the refractor rotates.

As an example, the following dimensions have produced good results in a refractor used in a motion picture projector designed for 8 mm. film of standard size:

Number of surfaces _____ 4.
Radius of curvature _____ 16 mm.
Type of curvature _____ Spherical.
Radius of circumf. 37 _____ 4.4 mm.
Type of glass _____ High-index Crown.
Refractive index _____ 1.62.

Although the refractor described in this application has been referred to as used in motion picture apparatus, it is to be understood that it can also be used in any case where it is desired to displace an image optically at a predetermined rate.

The foregoing disclosure and drawings are merely illustrative of the principles of this invention and are not to be interpreted in a limiting sense. The only limitations are to be determined from the appended claims.

What is claimed is:

1. An apparatus for continuous feed of motion picture film including a means for feeding the film, a source of light for projecting a light beam along an optical axis, and a projection lens; a rotatable refractor positioned between the film and the projection lens, said refractor comprising a transparent solid having an index of refraction greater than 1.3 but less than 1.9 and bounded by at least two spherical convex surfaces, each of said surfaces having equal areas and equal radii of curvatures, said refractor mounted for continuous rotation about an axis passing through its center, which axis intersects the optical axis of each surface in a transverse direction at a point between the center of curvature and the vertex of each surface but closer to said center of curvature than to said vertex, the radius of curvature being greater than the distance between the vertex and the center of the refractor but less than twice this distance, said centers of curvature being equidistant from the center of the refractor and subtending equal angles about it, and means for turning the refractor on its axis in synchronism with the motion of the film.

2. An apparatus for producing a stationary image derived from a continuously moving motion picture film including a source of light for projecting a light beam along an optical axis and a projection lens; an optical rectifying system including a stationary lens mounted on the optical axis, a rotatable refractor positioned between the stationary lens and an image plane where stationary images are produced, said refractor comprising a transparent solid having an index of refraction greater than 1.3 but less than 1.9 and bounded by at least two spherical convex surfaces, each of said surfaces having equal areas and equal radii of curvature, said refractor mounted for continuous rotation about an axis passing through its center, which axis intersects the optical axis of each surface in a transverse direction at a point between the center of curvature and the vertex of each surface but closer to said center of curvature than to said vertex, the radius of curvature being greater than the distance between the vertex and the center of the refractor but less than twice this distance, said centers of curvature being equidistant from the center of the refractor and subtending equal angles about it, and means for turning the refractor on its axis and for moving the film in synchronism.

3. An apparatus according to claim 2 wherein the motion picture film includes discrete frames and is moved at a constant speed, and the refractor is turned at a constant speed of rotation whereby it moves a fraction of a revolution equal to the reciprocal of the number of surfaces of the refractor, each time a single frame moves through the optical axis.

4. An apparatus for producing a stationary image derived from a continuously moving motion picture film including a source of light for projecting a light beam along an optical axis and a projection lens; an optical rectifying system including a stationary lens mounted on the optical axis, a rotatable refractor positioned between the stationary lens and an image plane where stationary images are produced, said refractor comprising a transparent solid having an index of refraction greater than 1.3 but less than 1.9 and bounded by a plurality of convex surfaces, each of said surfaces having equal areas and equal radii of curvature, said refractor mounted for continuous rotation about an axis passing through its center, which axis intersects the optical axis of each surface in a transverse direction at a point between the center of curvature and the vertex of each surface but closer to said center of curvature than to said vertex, the radius of curvature being greater than the distance between the vertex and the center of the refractor but less than twice this distance, said centers of curvature being equidistant from the center of the refractor and subtending equal angles about it, and means for moving the film and turning the refractor on its axis in synchronism.

5. In an apparatus for continuous feed of motion picture film, a rotary optical motion compensator consisting of a refracting solid bounded by a plurality of spherical convex surfaces of equal radii and made of a transparent material having an index of refraction greater than 1.3 but less than 1.9, said surfaces having their centers in a plane perpendicular to the axis of rotation of said compensator, said centers being equidistant from said axis and subtending equal angles around it, said axis intersecting the optical axis of each surface at a point between its center of curvature and its vertex, the radius of curvature being greater than the distance between the vertex and the center of the refractor but less than twice this distance, but closer to said center than to said vertex, said optical axes subtending equal angles about said axis of rotation.

6. In an apparatus for continuous feed of motion picture film, a rotary optical motion compensator consisting of a refracting solid bounded by a plurality of cylindrical convex surfaces of equal radii and made of a transparent material having an index of refraction greater than 1.3 but less than 1.9, said surfaces having their axes of curvature parallel to and equidistant from the axis of rotation of said compensator, said axis of rotation being closer to the axis of each surface than to its corresponding vertex, the radius of curvature being greater than the distance between the vertex and the center of the refractor but less than twice this distance, said surfaces subtending equal angles around said axis of rotation.

7. An apparatus for continuous feed of motion picture film comprising an imaging optical system having said film at one of its conjugate image planes, said optical system including at least one converging lens and, a rotary optical motion compensator consisting of a refracting solid bounded by a plurality of convex surfaces of equal radii, said solid being a transparent body with an index of refraction greater than 1.3 but less than 1.9, said radii having a length greater than the distance between the vertex of each surface and the axis of rotation of the compensator but less than twice this distance, each of said surfaces subtending equal angles about the axis of rotation, their centers of curvature also subtending equal angles about said axis, each surface having an optical axis defined by its vertex and its center of curvature said optical axes intersecting at the center of the compensator through which said axis of rotation passes, and means for moving the film at a constant linear speed in said conjugate image plane in a direction perpendicular to a plane defined by the optical axis of said optical system and the axis of rotation of the compensator, and for rotating the compensator in synchronism with the motion of the film.

8. An apparatus as claimed in claim 7 wherein said centers of curvature are on a circle having its center at the center of said compensator.

References Cited by the Examiner

UNITED STATES PATENTS 867,185    9/1907    Bianchi _____ 352—119

FOREIGN PATENTS 944,714    11/1948    France

OTHER REFERENCES

Gobel et al.: abstract of application Serial No. 665,933, published Jan. 17, 1950, 630 O.G. 858.

JULIA COINER, *Primary Examiner.*